United States Patent
Tobie et al.

(10) Patent No.: US 11,865,550 B2
(45) Date of Patent: Jan. 9, 2024

(54) SEPARATING INSTALLATION AND SEPARATING METHOD

(71) Applicant: Karlsruher Institut fuer Technologie (KIT), Karlsruhe (DE)

(72) Inventors: Winfried Tobie, Dettenheim (DE); Frank Becker, Stutensee (DE); Dieter Schild, Karlsruhe (DE); Markus Plaschke, Ettlingen (DE); Carla-Olivia Krauss, Karlsruhe (DE); Alexander Heneka, Karlsruhe (DE); Martin Brandauer, Karlsruhe (DE)

(73) Assignee: KARLSRUHER INSTITUT FUER TECHNOLOGIE (KIT), Karlsruhe (DE)

( * ) Notice: Subject to any disclaimer, the term of this patent is extended or adjusted under 35 U.S.C. 154(b) by 134 days.

(21) Appl. No.: 17/049,593

(22) PCT Filed: Mar. 26, 2019

(86) PCT No.: PCT/EP2019/000096
§ 371 (c)(1),
(2) Date: Oct. 22, 2020

(87) PCT Pub. No.: WO2019/206445
PCT Pub. Date: Oct. 31, 2019

(65) Prior Publication Data
US 2021/0245170 A1   Aug. 12, 2021

(30) Foreign Application Priority Data
Apr. 27, 2018 (DE) .......................... 102018110204.6

(51) Int. Cl.
*B03C 1/30*   (2006.01)
*B03C 1/28*   (2006.01)
(Continued)

(52) U.S. Cl.
CPC ................ *B03C 1/30* (2013.01); *B03C 1/286* (2013.01); *C02F 1/444* (2013.01); *C02F 1/481* (2013.01);
(Continued)

(58) Field of Classification Search
CPC ....... B03C 1/30; B03C 1/286; B03C 2201/18; B03C 2201/28; B03B 7/00; C02F 1/444; C02F 1/481; C02F 9/00; C02F 2101/006
See application file for complete search history.

(56) References Cited

U.S. PATENT DOCUMENTS 2,325,149 A   7/1943   Arms et al.
2,954,122 A   9/1960   Colburn
(Continued)

FOREIGN PATENT DOCUMENTS

| EP | 1243559 A2 | 9/2002 |
| EP | 1486308 A2 | 12/2004 |
| EP | 2799518 A1 | 11/2014 |

*Primary Examiner* — Liam Royce
(74) *Attorney, Agent, or Firm* — LEYDIG, VOIT & MAYER, LTD.

(57) ABSTRACT

A separating installation for separating magnetic and non-magnetic particles present in a suspension includes a stirring stage having a stirrer configured to create the suspension, a filter stage configured to filter the suspension according to grain size by at least one particle filter, and a screening stage having at least one wet screen. The separating installation further includes a magnetic filter stage having at least one magnetic filter. The stirring stage, the filter stage, the screening stage, and the magnetic stage are interconnected by a pipe system in such a way that they form a circuit.

3 Claims, 1 Drawing Sheet

(51) Int. Cl.
   *C02F 9/00*      (2023.01)
   *C02F 1/44*      (2023.01)
   *C02F 1/48*      (2023.01)
   *C02F 101/00*    (2006.01)

(52) U.S. Cl.
   CPC ............ *C02F 9/00* (2013.01); *B03C 2201/18* (2013.01); *B03C 2201/28* (2013.01); *C02F 2101/006* (2013.01)

(56) References Cited

U.S. PATENT DOCUMENTS 6,156,194 A    12/2000  Lamoureux
6,419,833 B1    7/2002  Lamoureux

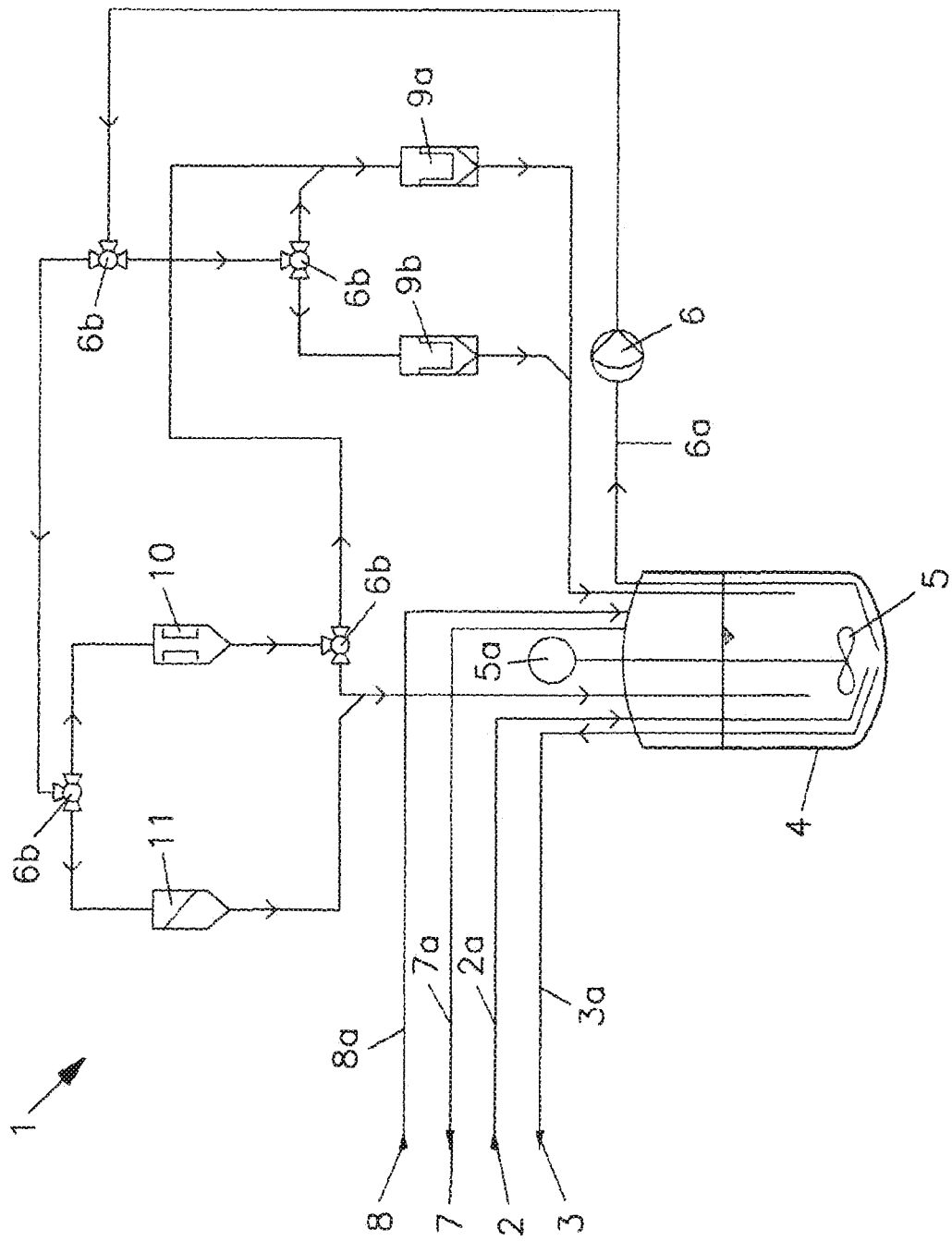

SEPARATING INSTALLATION AND SEPARATING METHOD

CROSS REFERENCE TO RELATED APPLICATIONS

This application is a U.S. National Phase Application under 35 U.S.C. § 371 of International Application No. PCT/EP2019/000096, filed on Mar. 26, 2019, and claims benefit to German Patent Application No. DE 10 2018 110 204.6, filed on Apr. 27, 2018. The International Application was published in German on Oct. 31, 2019, as WO 2019/206445 A1 under PCT Article 21(2).

FIELD

The invention relates to a separating installation and a separating method for separating magnetic and non-magnetic particles present in a suspension. A field of application in which the invention can be used is the decommissioning of nuclear installations.

BACKGROUND

The radioactive waste that forms in this case is to be stored in special protective containers in deep geological formations. However, the capacity of deep geological formations is limited. Furthermore, the construction of the protective containers is associated with high costs. The aim is therefore to maximize the utilization of space in the protective containers in order to ensure a space-saving and cost-efficient permanent storage in the deep geological formations. The taking apart of radioactive (preferably neutron-activated) components from nuclear installations is optimized in order to enable the greatest possible utilization of space in the protective containers and thus to produce as little waste volume as possible.

For reactor pressure vessels made of steel and the associated internals made of different materials (preferably steel but also non-ferrous metals) taking apart takes place, for example, with an abrasive water-jet cutting method (AWJ method). Here, a suspension consisting of water and a sharp-edged abrasive agent, such as garnet, is guided under high pressure through a nozzle above the material to be cut. Cutting with a high-pressure jet makes it possible to work on components that are under mechanical stress or at locations that are difficult to access. This method has already been successfully used to cut up parts of a reactor pressure vessel and associated internals. The cutting process takes place with water covering. Radioactive steel particles which arise during the cutting process remain below the surface of the water and sink with the abrasive agent to the bottom. As a result, the formation of hydrosols or aerosols is avoided during the stripping-out of the radioactive components. However, the suspension is contaminated by the radioactive steel particles (and possibly by other radioactive particles).

The abrasive agent contained in the suspension with the radioactive particles must be disposed of as secondary waste. The amount of secondary waste produced during the taking apart of the reactor pressure vessels and the associated internals with the AWJ method is considerable, such that the total volume of radioactive waste increases enormously. Despite its technical advantages, the AWJ method is therefore only used to a limited extent in the field of decommissioning nuclear installations.

The steels used for the reactor pressure vessels and their internals have a higher magnetic susceptibility than does the abrasive agent used. The radioactive steel particles arising during the cutting process can therefore be influenced by an external magnetic field.

EP 1486 308 A2 discloses a method using an external magnetic field to separate magnetic steel particles from the cutting agent waste of a granite-cutting installation. First of all, the magnetic steel particles are removed from the cutting agent waste by using a magnetic device. The particles are then further separated by size in a shaking screen. Particles that remain on the screen are returned to the cutting agent. Particles that fall through the screen consist largely of abrasion dust from the cutting blades used. They are too small to be used as a cutting agent and are therefore disposed of.

A method and a device for separating radioactive particles from abrasive cutting agent is known from U.S. Pat. No. 6,419,833 B1 and U.S. Pat. No. 6,156,194 A. The aim thereof is to minimize the amount of radioactive waste produced during the dismantling of radioactive steel components by means of abrasive waterjet cutting methods. The cutting operation takes place inside a separate chamber and underwater in order to bind radioactive hydrosols and aerosols. The mixture of abrasive cutting material and radioactive steel particles arising during the cutting operation is fed to a multistage separating unit which contains a magnetic filter. The magnetic filter separates a major part of the radioactive steel particles from the mixture. They are fed to special containers for highly radioactive waste. Smaller radioactive steel particles remain in the abrasive cutting agent. The abrasive cutting agent is therefore handled as secondary waste. Conventionally it is stored less expensively—which is not possible in Germany due to the Radiation Protection Ordinance. However, the total volume of radioactive waste does not decrease.

SUMMARY

In an embodiment, the present invention provides a separating installation for separating magnetic and non-magnetic particles present in a suspension. The separating installation includes a stirring stage having a stirrer configured to create the suspension, a filter stage configured to filter the suspension according to grain size by at least one particle filter, and a screening stage having at least one wet screen. The separating installation further includes a magnetic filter stage having at least one magnetic filter. The stirring stage, the filter stage, the screening stage, and the magnetic stage are interconnected by a pipe system in such a way that they form a circuit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 is a schematic view of a separating installation according to an embodiment.

DETAILED DESCRIPTION

The present disclosure describes a separating installation for separating magnetic and non-magnetic particles from a suspension in a circuit which can overcome the above-mentioned restrictions and reduce radioactive (secondary) waste by reusing a large part of the abrasive used.

The present disclosure further describes a method that is compact and easy to carry out for separating magnetic and non-magnetic particles present in a suspension.

A first embodiment of the separating installation for separating magnetic and non-magnetic particles present in a suspension has a stirring stage which has a stirrer for creating the suspension; a filter stage for filtering the suspension according to grain size by means of one or more particle filters; a screening stage which has one or more wet screen(s); and a magnetic filter stage which has one or more magnetic filters. The stages of the installation are interconnected by a pipe system and by switch-over fittings in such a way that they form a circuit.

The magnetic and non-magnetic particles are all particles with different magnetic properties, wherein the particles have different susceptibilities. The magnetic filter thus filters out from a particle mixture in the suspension those particles which exceed a predetermined susceptibility.

The abrasive agent contained in the suspension contains iron particles, the magnetic susceptibility of which is so low that they are not separated out via the magnetic filter.

A "circuit" as used herein can refer to stages of the installation being interconnected in such a way that all stages can be supplied with suspension from a central stage—the stirring stage—and that the suspension can also be circulated without the suspension leaving the installation before screening and filtering are completed. The suspension comprises a liquid containing the abrasive particles and radioactive particles which is produced by the AWJ method and which are present in a heterogeneous mixture of substances consisting of the liquid, e.g. water, and finely distributed solids therein. Since the suspension has a tendency for phase separation, it must be stirred during operation of the installation, the central stirring stage being present for this reason.

Advantageously, a combination of wet screening and magnetic filtration takes place in the separating installation in order to enable reuse of the abrasive grain fraction in the cutting process. Waste volume is thereby reduced.

In one development of the separating installation, it can be provided that the filter stage has two particle filters. The particle filters can each have a filter membrane having a pore diameter in a range from 0.5 µm to 5 µm or in a range from 50 µm to 500 µm. Two filters with different filter membranes or a plurality of filters can thus be arranged next to one another and filter the suspension within these stages in two or more passes. The filter membranes are designed to be easily replaceable so that radioactive waste can be disposed of simply and safely by replacing the particle filters.

Furthermore, the magnetic filter of the magnetic filter stage can comprise one or more extractor tubes having one or more permanent magnets arranged therein. The permanent magnet can be removed from the magnetic filter in order to clear the filter.

In a further development of the separating installation, it can be provided that the wet screen of the screening stage has a screen base or a plurality of screen bases. The screen base can be mounted movably so that screen movements can be executed, wherein a mesh width of the screen base lies in a range from 1 µm to 500 µm, preferably in a range from 100 µm to 200 µm. This size is particularly advantageous because it corresponds to a practicable size and thus screens out the reusable part of the abrasive particles.

In one development, the separating installation can provide that the stirring stage comprises a stirring vessel in which the stirrer is arranged. The suspension can thereby be continuously stirred and kept mixed. Furthermore, the stirring stage can be connected to or have a ventilation unit or a connection to a compressed air supply for transporting away radiolysis gases or for equalizing pressure.

In order to be able to convey the suspension to the individual stages, a conveying device is assigned to the pipe system. The conveying device is a pump in this case, in particular a diaphragm pump, which is arranged downstream of the stirring stage. By operating with preferably one diaphragm pump, blockages due to standstill can be effectively avoided.

In order to fill the separating installation with the suspension and to empty it again of the screened and filtered suspension, the separating installation can have an inlet and an outlet. The suspension can be loaded via the inlet into the stirring vessel of the stirring stage by means of an inlet line. Via the outlet, the installation can be unloaded again by means of an outlet line from the stirring vessel of the stirring stage. Advantageously, the stirring stage as a central stage is equipped with only one inlet and only one outlet. As a result, the entire installation can be designed to be very compact and realized in a self-contained manner.

In a further development, the separating installation as a compact installation can be provided with its own power supply and a control unit. Cable-bound or wireless control via a mobile operating point is thus also possible, and fully automatic or manual operation can be enabled.

The essential advantage of the separating installation shown is the combination of magnetic and mechanical filter/screening stages for the treatment of radioactively contaminated abrasive from the AWJ method. Secondary waste can be considerably reduced by reusing the abrasive.

A separating method for separating magnetic and non-magnetic particles present in a suspension is performed using a separating installation, e.g. as described above. A method comprises the following steps:

(a) feeding the suspension via the inlet and thus loading the stirring vessel of the stirring stage with the suspension with magnetic and non-magnetic particles;

(b) continuously stirring the suspension in the stirring vessel by means of the stirrer;

(c) conveying the suspension through the pipe system by means of the conveying device, thereby:

(c1) feeding the suspension to the screening stage and screening the suspension by means of the wet screen or the wet screens, thereby screening out particles which are larger than the mesh width of the screen base, (c2) further feeding the suspension to the filter stage and filtering the suspension in at least one of the two filters, (c3) unloading the screen base of the wet screen, for this purpose moving the screen base from a screening position to an unloading position and discharging the screened-out particles into the stirring stage; and (c4) further feeding the suspension to the magnetic filter stage and, by means of the magnetic filter, filtering the magnetic particles and thereby separating the magnetic from the non-magnetic particles;

(c5) feeding the non-magnetic particles to the stirring stage;

(d) after at least one circuit of steps (b) to (c5), discharging the filtered and screened suspension from the stirring vessel via the outlet for reuse of the abrasive.

In one development, the suspension can be loaded from the inlet into the stirring vessel via the inlet line in order to load the separating installation. Furthermore, the suspension can be conveyed continuously through the separating installation by means of the conveying device. After separation of the particles, the screened and filtered suspension can be unloaded from the stirring vessel to the outlet via the outlet line.

Furthermore, in an expanded step, the suspension can be fed to the filter stage: Firstly, the suspension is filtered in the particle filter, the filter membrane of which has a pore diameter in a range from 50 µm to 500 µm, preferably 100 µm, and then the suspension is filtered in the particle filter, the filter membrane of which has a pore diameter in a range from 0.5 µm to 50 µm, preferably 1 µm.

In a further step, after step (c1) the screen base of the wet screen can be rinsed off and the collected particles can be filtered by means of the particle filter, the filter membrane of which has a pore diameter in a range from 0.5 µm to 50 µm, preferably 1 µm.

The magnetic filter can be unloaded by pulling the magnetic rod/magnet rods out of the extractor tube of the magnetic filter and filtering the remaining particles from the magnetic filter in the particle filter, the filter membrane of which has a pore diameter in a range from 0.5 µm to 50 µm, preferably 1 µm.

With the aforementioned steps, executed individually or in combination, the smallest particles can be filtered out, which can then be disposed of simply and are no longer present in the reusable abrasive.

A simple and compact method is thus provided, by means of which radioactive steel particles can be filtered out of used abrasive. Due to its compact construction, the installation is safe to transport and, via the reduced process connections for input (used abrasive) and output (reusable abrasive) can also be rapidly decontaminated. The particle filters also retain radioactive particles which cannot be separated out by the magnetic filter. This is particularly advantageous for reactor pressure vessel internals made of non-ferrous metals or other materials. The abrasive particles separated out in the separating installation can be reused as abrasive for further cuts, as a result of which waste volume and required amount of abrasive is reduced.

For start-up operation, the installation can for the first time be filled with suspension for separation. The magnetic filter will not then be loaded and there will not be any steel particles on the extractor tubes. The particle filters and the wet screen are not loaded. Process steps (c1)-(c5) can be performed. The reusable abrasive is then discharged via the outlet and the stirring vessel will again be empty and can be refilled with suspension.

For operation, the stirring vessel of the installation can be refilled with suspension after start-up operation. After start-up operation, separated steel particles are present on the extractor tubes.

After filtering with the particle filter, the filter membrane of which has a pore diameter in a range from 0.5 µm to 50 µm, preferably 1 µm, these particles can be filtered through the particle filter, the filter membrane of which has a pore diameter in a range from 0.5 µm to 50 µm, preferably 1 µm, by switching the 3/2-way stopcocks via the circuit from the magnetic filter and by pulling the magnetic rods out of the extractor tubes.

The abrasive in the wet screen, which contains steel particles larger than 180 mm, can then be flushed out via the particle filter, the filter membrane of which has a pore diameter in a range from 0.5 µm to 50 µm, preferably 1 µm.

To take the installation out of operation after discharging the last suspension charge from the stirring vessel, the stirring vessel can be filled with a cleaning solution (decontamination solution) and process steps (a)-(d) can be performed in order to ensure that all components and the pipeline system are cleared of particles larger than 1 µm.

Advantageously, the separating installation can be set up and operated in radioactive control areas by means of screening housings, particularly also in radioactive restricted areas or even in conventional areas. Treatment takes place directly and promptly, which is important especially in the case of ferritic steels on account of the problem of rust. No drying processes are necessary, since the processing takes place as a suspension (liquid-solid-solid).

Other embodiments as well as some of the advantages associated with these and other embodiments will be become clear and more understandable through the following detailed description with reference to the accompanying FIGURE. The FIGURE is merely a schematic representation of one embodiment of the disclosure.

A device according to an embodiment relates to a separating installation 1 which has an inlet 2 and an outlet 3 for conveying and discharging, respectively, a suspension of liquid and abrasive which consists of magnetic and non-magnetic particles.

The separating installation 1 has a stirring stage, a particle filter stage, a screening stage and a magnetic filter stage which are interconnected as follows:

The inlet 2 is connected via a supply line 2a to the stirring stage, which has a stirring vessel 4. A stirrer 5 is arranged in the stirring vessel 4 and continuously stirs the suspension within the stirring vessel 4 in order to prevent phase separation. A motor 5a is assigned to the stirrer 5.

Arranged downstream of the stirring vessel 4 is a pipe system 6a which connects all of the other stages directly and indirectly to the stirring stage. Downstream directly after the stirring vessel 4 is a diaphragm pump 6 which keeps the suspension circulating within the installation 1. Arrows in each case indicate the conveying direction in which the suspension is to be conveyed. In order to keep the installation 1 compact, the pipe system 6a is designed such that valves 6b— here 3/2-way stopcocks—are provided between the stages.

Downstream of the diaphragm pump 6, a valve 6b leads to the screening/magnetic filter stage and to the filter stage with two particle filters 9a, 9b. The particle filters are arranged next to one another and can only be conveyed to individually. Each outlet of the particle filters 9a, 9b leads back into the stirring vessel 4. The particle filters 9a, 9b are bag filters, wherein a first particle filter 9a of the two particle filters 9a, 9b filters out particles with grain sizes larger than 1 µm and a second particle filter 9b filters out particles with grain sizes larger than 100 µm.

The magnetic filter stage has a magnetic filter 10 which has an extractor tube or a plurality of extractor tubes with permanent magnets arranged therein. The screening stage adjacent to the magnetic filter stage comprises one or more wet screens 11 which in the embodiment shown have a rotatable screen base with a mesh width of approximately 180 µm. In one development, other screening techniques (for example with a continuous mode of operation) can also be used.

Both stages are connected to the stirring vessel 4 again or to the particle filter stage via the pipe system 6a.

Compressed air can be fed via a supply line 8a via a compressed-air entry 8. Furthermore, the connection to a ventilation system 7 for equalizing pressure is possible via a supply line 7a.

The process steps performed with the separating installation 1 are as follows:

Firstly, the stirring vessel 4 is filled with suspension via the inlet 2.

In a first step, the screen base of the wet screen 11 is placed in a loading position and the suspension is passed through the screening stage, as a result of which particles are screened out, separated into two fractions (if possible in the size larger than 180 μm). The fraction with the large particles predominantly consists of the abrasive particles which can be reused later. In the next method step, the treated suspension is conveyed via the stirring vessel 4 to the particle filter stage. Firstly, in the particle filter 9b, the particles with grain sizes larger than 100 μm are filtered off.

The filtered suspension is then again conveyed through the stirring vessel 4 and fed to the particle filter 9a, where grain sizes larger than 1 μm are filtered off.

After this, the particle mixture present in the screen base of the wet screen 11 is rinsed off and from the rinsing operation the particles larger than 1 μm are filtered out by means of the particle filter 9a. The filtered-off particles in the particle filters are disposed of as radioactive waste.

A next step involves unloading the screen base of the wet screen 11 (for this purpose rotating the screen base into the unloading position). The rinsed particle mixture or the reusable abrasive is emptied into the stirring vessel 4. After stirring again, the suspension is conveyed to the magnetic filter and steel particles larger than 180 μm are separated out by means of the magnet.

The reusable abrasive which has passed the magnetic filter is now back in the stirring vessel 4 and can then be removed from there via the outlet.

After the magnetic rods have been pulled out of the extractor tubes, the steel particles separated out in the magnetic filter are unloaded into the 1 μm particle filter 9a and are disposed of from there as radioactive waste. Should a pass have already taken place in advance, the magnets of the magnetic filter 10 can be pulled and the magnetic filter 10 can be unloaded into the particle filter 9a while the suspension passes the filter stage.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Separating installation
2 Inlet
2a Inlet line
3 Outlet
3a Outlet line
4 Stirring vessel
5 Stirrer
5a Stirrer motor
6 Diaphragm pump
6a Pipe system
6b 3/2-way stopcock
7 Ventilation system
7a Ventilation supply line
8 Compressed air entry
8a Compressed air supply line
9a Particle filter
9b Particle filter
10 Magnetic filter
11 Wet screen

The invention claimed is:

1. A separating method for separating magnetic particles and non-magnetic particles present in a suspension, the separating method comprising:
   (a) feeding-in the suspension via an inlet and thus loading a stirring vessel of a stirring stage with the suspension including the magnetic particles and the non-magnetic particles;
   (b) continuously stirring the suspension in the stirring vessel by a stirrer;
   (c) conveying, by a conveying device, the suspension through a pipe system, thereby:
      (c1) feeding the suspension to a screening stage and screening the suspension by a wet screen, thereby screening out particles which are larger than a mesh width of a screen base of the wet screen to provide screened-out particles,
      (c2) further feeding the suspension to a particle filter stage and filtering the suspension in at least one particle filter of two particle filters, the two particle filters each comprising a bag filter and each having a filter membrane having a pore diameter in a range from 0.5 μm to 5 μm or in a range from 50 μm to 500 μm,
      (c3) unloading the screen base of the wet screen by moving the screen base from a screening position into an unloading position and discharging the screened-out particles into the stirring stage,
      (c4) further feeding the suspension to a magnetic filter stage and, by a magnetic filter, filtering the magnetic particles and thereby separating the magnetic particles from the non-magnetic particles, and
      (c5) feeding the non-magnetic particles to the stirring stage; and
   (d) after at least one cycle of (b) to (c5), discharging the filtered and screened suspension from the stirring vessel via an outlet.

2. The method according to claim 1, wherein the suspension:

is loaded from the inlet into the stirring vessel via an inlet line in order to load the separating installation, is conveyed continuously through the separating installation by the conveying device, and after separation of the magnetic and non-magnetic particles, is unloaded from the stirring vessel to the outlet via an outlet line.

3. The method according to claim 1, further comprising at least one of:

feeding the suspension to the particle filter stage and filtering the suspension in a first particle filter of the two filters, wherein the filter membrane of the first particle filter has a pore diameter in a range from 50 µm to 500 µm, and then filtering the suspension in a second particle filter of the two filters, wherein the filter membrane of the second particle filter has a pore diameter in a range from 0.5 µm to 5 µm;

rinsing the screen base of the wet screen and filtering the screened-out particles by the second particle filter; or pulling a magnetic rod out of an extractor tube of the magnetic filter and filtering the particles from the magnetic filter in the second particle filter.

* * * * *